US011745167B2

(12) United States Patent
Rasmussen et al.

(10) Patent No.: US 11,745,167 B2
(45) Date of Patent: Sep. 5, 2023

(54) POLYMER MATRIX COMPOSITES COMPRISING FUNCTIONAL PARTICLES AND METHODS OF MAKING THE SAME

(71) Applicant: 3M INNOVATIVE PROPERTIES COMPANY, St. Paul, MN (US)

(72) Inventors: Jerald K. Rasmussen, Woodville, WI (US); Derek J. Dehn, Maplewood, MN (US); Clinton P. Waller, Jr., White Bear Lake, MN (US); Bharat R. Acharya, Woodbury, MN (US); Satinder K. Nayar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 470 days.

(21) Appl. No.: 16/763,339

(22) PCT Filed: Nov. 15, 2018

(86) PCT No.: PCT/IB2018/058999
§ 371 (c)(1),
(2) Date: May 12, 2020

(87) PCT Pub. No.: WO2019/097446
PCT Pub. Date: May 23, 2019

(65) Prior Publication Data
US 2020/0330958 A1    Oct. 22, 2020

Related U.S. Application Data

(60) Provisional application No. 62/587,041, filed on Nov. 16, 2017.

(51) Int. Cl.
*B01J 20/28*    (2006.01)
*B01D 39/16*    (2006.01)
(Continued)

(52) U.S. Cl.
CPC .... *B01J 20/28026* (2013.01); *B01D 39/1676* (2013.01); *B01J 20/103* (2013.01);
(Continued)

(58) Field of Classification Search
CPC .. B01J 20/28026; B01J 20/103; B01J 20/106; B01J 20/22; B01J 20/261; B01J 20/265;
(Continued)

(56) References Cited

U.S. PATENT DOCUMENTS 3,954,927 A    5/1976  Duling
4,539,256 A    9/1985  Shipman
(Continued)

FOREIGN PATENT DOCUMENTS

EP    0365111    4/1990
EP    1141103    2/2005
(Continued)

OTHER PUBLICATIONS

US 8,594,357 B1, 11/2013, Lin (withdrawn)
(Continued)

*Primary Examiner* — Andrew J. Oyer

(57) ABSTRACT

A polymer matrix composite comprising a porous polymeric network; and a plurality of functional particles distributed within the polymeric network structure, and wherein the polymer matrix composite has an air flow resistance at 25° C., as measured by the "Air Flow Resistance Test," of less than 300 seconds/50 cm³/500 micrometers; and wherein the polymer matrix composite has a density of at least 0.3 g/cm³; and methods for making the same. The polymer matrix composites are useful, for example, as filters.

19 Claims, 4 Drawing Sheets

10μm

(51) Int. Cl.
    *B01J 20/10*     (2006.01)
    *B01J 20/22*     (2006.01)
    *B01J 20/26*     (2006.01)
    *B01J 20/30*     (2006.01)

(52) U.S. Cl.
    CPC ............ *B01J 20/106* (2013.01); *B01J 20/22* (2013.01); *B01J 20/261* (2013.01); *B01J 20/265* (2013.01); *B01J 20/28021* (2013.01); *B01J 20/305* (2013.01); *B01J 20/3007* (2013.01); *B01D 2239/0407* (2013.01); *B01D 2239/10* (2013.01); *B01D 2239/1208* (2013.01)

(58) Field of Classification Search
    CPC .............. B01J 20/28021; B01J 20/3007; B01J 20/305; B01J 20/28011; B01J 20/26; B01D 39/1676; B01D 2239/0407; B01D 2239/10; B01D 2239/1208; C08J 9/0061; C08J 2201/0522; C08J 2323/06; C08J 2400/106; C08J 9/28
    See application file for complete search history.

(56) References Cited

U.S. PATENT DOCUMENTS

| | | |
|---|---|---|
| 4,791,037 A | 12/1988 | Anderman |
| 4,833,172 A | 5/1989 | Schwarz |
| 4,957,943 A | 9/1990 | McAllister |
| 5,059,637 A | 10/1991 | Langer |
| 5,071,610 A | 12/1991 | Hagen |
| 5,120,154 A | 6/1992 | Lasch |
| 5,292,840 A | 3/1994 | Heilmann |
| 5,389,434 A | 2/1995 | Chamberlain |
| 5,510,412 A | 4/1996 | Suzuki |
| 5,567,757 A | 10/1996 | Szczepanski |
| 5,643,511 A | 7/1997 | Pluyter |
| 5,827,445 A | 10/1998 | Yoshida |
| 5,828,940 A | 10/1998 | Learman |
| 5,993,935 A * | 11/1999 | Rasmussen .......... B01J 20/3204 428/297.1 |
| 6,153,674 A | 11/2000 | Landen |
| 6,171,723 B1 | 1/2001 | Loch |
| 6,341,384 B1 | 1/2002 | Hayes |
| 6,379,952 B1 | 4/2002 | Rasmussen |
| 6,387,519 B1 | 5/2002 | Anderson |
| 6,423,666 B1 | 7/2002 | Liao |
| 6,458,418 B2 | 10/2002 | Langer |
| 6,468,678 B1 | 10/2002 | Dahlin |
| 6,524,742 B1 | 2/2003 | Emanuel |
| 6,548,972 B2 | 4/2003 | Takagi |
| 6,558,840 B1 | 5/2003 | Hikmet |
| 6,562,448 B1 | 5/2003 | Chamberlain |
| 6,692,799 B2 | 2/2004 | Waller, Jr. |
| 6,820,382 B1 | 11/2004 | Chambers |
| 7,229,683 B2 | 6/2007 | Fisher |
| 7,323,214 B2 | 1/2008 | Wakayama |
| 7,582,684 B2 | 9/2009 | Rasmussen |
| 7,674,835 B2 | 3/2010 | Rasmussen |
| 7,674,836 B2 | 3/2010 | Rasmussen |
| 7,682,536 B2 | 3/2010 | Miller |
| 7,709,098 B2 | 5/2010 | Yoda |
| 7,744,991 B2 | 6/2010 | Fisher |
| 7,940,447 B2 | 5/2011 | Wu |
| 7,953,240 B2 | 5/2011 | Matsumura |
| 7,955,570 B2 | 6/2011 | Insley |
| 8,080,210 B2 | 12/2011 | Hornback, III |
| 8,265,330 B2 | 9/2012 | Fukunishi |
| 8,292,023 B2 | 10/2012 | Slotte |
| 8,314,046 B2 | 11/2012 | Brady |
| 8,335,333 B2 | 12/2012 | Saiki |
| 8,367,198 B2 | 2/2013 | Wickert |
| 8,522,829 B2 | 9/2013 | D'Souza |
| 8,592,493 B2 | 11/2013 | Shannon |
| 8,687,836 B2 | 4/2014 | Lin |
| 8,692,639 B2 | 4/2014 | Baarman |
| 8,698,394 B2 | 4/2014 | McCutcheon |
| 8,710,111 B2 | 4/2014 | Wickert |
| 8,767,998 B2 | 7/2014 | Imamura |
| 8,794,373 B1 | 8/2014 | Lin |
| 8,885,863 B2 | 11/2014 | Takashima |
| 8,942,402 B2 | 1/2015 | Yuasa |
| 8,974,706 B2 | 3/2015 | Somasiri |
| 9,018,267 B2 | 4/2015 | Shannon |
| 9,056,316 B2 | 6/2015 | Lawson |
| 9,105,382 B2 | 8/2015 | Heikkila |
| 9,251,950 B2 | 2/2016 | Hatanaka |
| 9,657,038 B2 | 5/2017 | Griesgraber |
| 9,675,722 B2 | 6/2017 | Ahimou |
| 9,681,996 B2 | 6/2017 | Prioleau |
| 9,714,442 B2 | 7/2017 | Sherman |
| 9,725,545 B2 | 8/2017 | Wickert |
| 9,738,919 B2 | 8/2017 | Mach |
| 9,759,663 B2 | 9/2017 | Halverson |
| 9,772,321 B2 | 9/2017 | Wendland |
| 2002/0078793 A1 | 6/2002 | Holl |
| 2006/0099454 A1 | 5/2006 | Morikoshi |
| 2007/0086965 A1 | 4/2007 | Mohanty |
| 2010/0314162 A1 | 12/2010 | Gardner |
| 2011/0048844 A1 | 3/2011 | Papakyriacou |
| 2011/0115429 A1 | 5/2011 | Toivola |
| 2012/0145468 A1 | 6/2012 | Pekala |
| 2012/0183775 A1 | 7/2012 | Shinba |
| 2013/0170687 A1 | 7/2013 | Papakyriacou |
| 2013/0170690 A1 | 7/2013 | Backman |
| 2013/0323310 A1 | 12/2013 | Smyth |
| 2014/0008974 A1 | 1/2014 | Miyamoto |
| 2014/0037922 A1 * | 2/2014 | Boyer .................... C08J 9/0066 428/221 |
| 2014/0212612 A1 | 7/2014 | Sbrigha |
| 2014/0254836 A1 | 9/2014 | Tong |
| 2014/0309314 A1 | 10/2014 | Sahouani |
| 2015/0099168 A1 | 4/2015 | Guo |
| 2015/0235753 A1 | 8/2015 | Chatani |
| 2016/0044838 A1 | 2/2016 | Aga |
| 2016/0118711 A1 | 4/2016 | Finn |
| 2017/0049926 A1 | 2/2017 | Langer-Anderson |
| 2017/0117598 A1 | 4/2017 | Matsushita |
| 2017/0155117 A1 | 6/2017 | Arise |
| 2018/0038862 A1 | 2/2018 | Kshirsagar |
| 2018/0051172 A1 | 2/2018 | Kawagishi |
| 2018/0174723 A1 | 6/2018 | Acharya |
| 2019/0144613 A1 | 5/2019 | Dehn |
| 2019/0144625 A1 | 5/2019 | Acharya |
| 2019/0144626 A1 | 5/2019 | Dehn |

FOREIGN PATENT DOCUMENTS

| | | |
|---|---|---|
| JP | 11176680 | 7/1999 |
| JP | 2000004097 | 1/2000 |
| JP | 2002289414 | 1/2002 |
| JP | 2011199574 | 10/2011 |
| JP | 2012167181 A | 9/2012 |
| JP | 5522282 | 7/2013 |
| KR | 101627043 | 3/2016 |
| WO | WO 1992-06577 | 4/1992 |
| WO | WO 2001-41213 | 6/2001 |
| WO | WO 2001-078085 | 10/2001 |
| WO | WO 2009-006254 | 1/2009 |
| WO | WO 2010-108148 | 9/2010 |
| WO | WO 2012-040032 | 3/2012 |
| WO | WO 2016-149233 | 9/2016 |
| WO | WO 2016-178120 | 11/2016 |
| WO | WO 2018-116127 | 6/2018 |
| WO | WO 2018-231687 | 12/2018 |
| WO | WO 2019-097445 | 5/2019 |
| WO | WO 2019-097446 | 5/2019 |
| WO | WO 2019-097447 | 5/2019 |
| WO | WO 2019-097449 | 5/2019 |
| WO | WO 2019-097451 | 5/2019 |
| WO | WO 2019-099603 | 5/2019 |

(56) References Cited

OTHER PUBLICATIONS

Plattenberger et al. "Calcium silicate crystal structure imparts reactivity with $CO_2$ and precipitate chemistry" Environ. Sci. Technol. Lett. 2018 p. 558-563 (Year: 2018).*
Baker-Jarvis, Dielectric and Magnetic Properties of Printed Wiring Boards and Other Substrate Materials, United States Department of Commerce National Institute of Standards and Technology (NIST) Technical Note, Mar. 1, 1999, vol. 1512, 84 pages.
Bechwati et al., "Low Frequency Sound Propagation in Activated Carbon," The Journal of the Acoustical Society of America, Jul. 2021, vol. 132, No. 1, pp. 239-248.
Kesting, "Synthetic Polymeric Membranes A Structural Perspective" $2^{nd}$ Edition, 1985, ISBN-13: 978-0471807179, pp. 111, 261-264.
Oswald, Materials Science and Polymers for Engineers, 494-496, (2012).
Schaller, "High-Performance Polyethylene Fibers "Al Dente": Improved Gel-Spinning of Ultrahigh Molecular Weight Polyethylene Using Vegetable Oils", Macromolecules, 2015, vol. 48, No. 24, pp. 8877-8884.
Sebastian, "Dielectric materials for Wireless communication" Elsevier, 2008—pp. 1-10 Chapter 1.
Small, "Closed-Box Loudspeaker Systems", Journal of the Audio Engineering Society, Dec. 1972, vol. 20, No. 10, pp. 798-808.
International Search report for PCT International Application No. PCT/IB2018/058999 dated Feb. 25, 2019, 5 pages.
International Search Report for PCT International Application No. PCT/US2018/061181, dated Jul. 3, 2019, 5 pages.
International Search Report for PCT International Application No. PCT/IB2018/059000, dated Feb. 25, 2019, 5 pages.

* cited by examiner

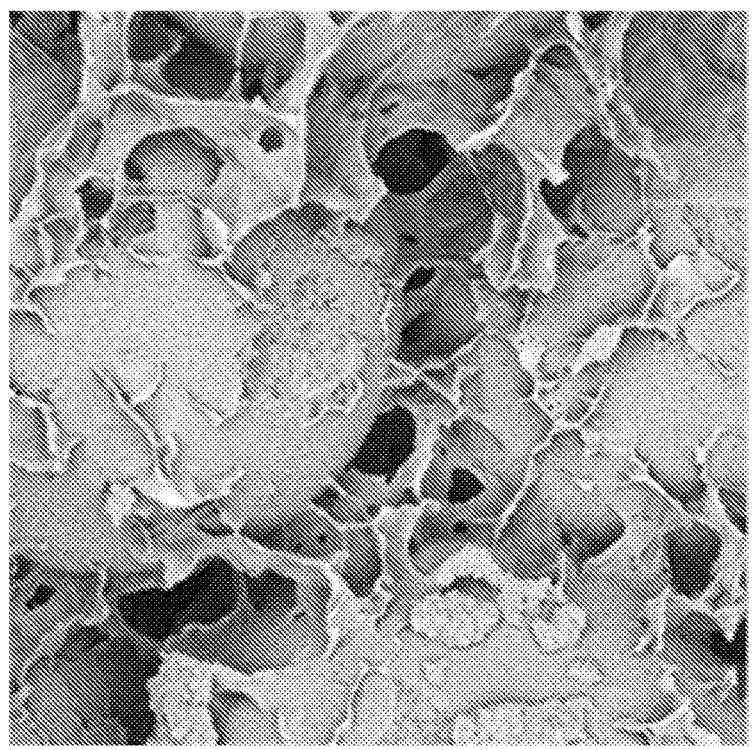
*Fig. 4A* 10μm
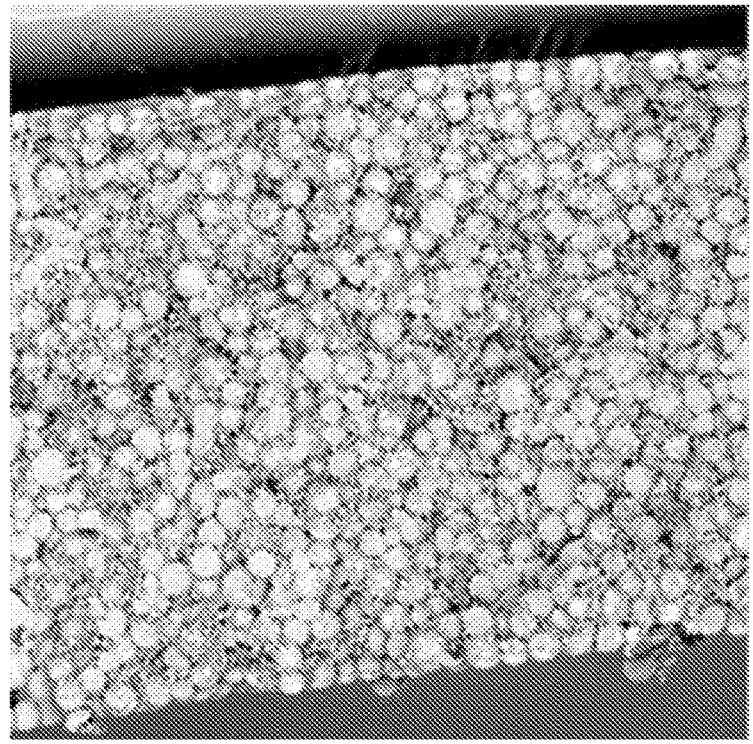
*Fig. 4B* 300μm

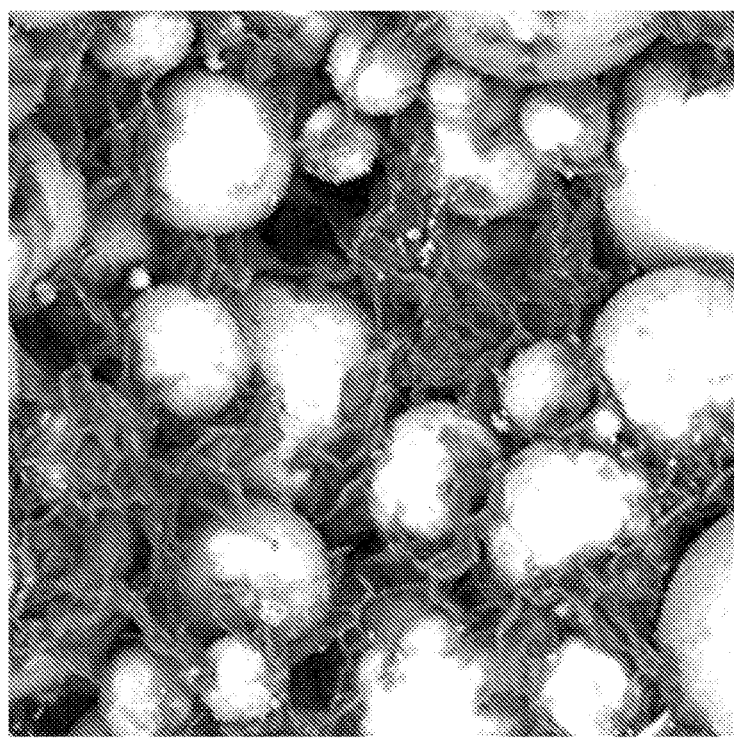
*Fig. 6*    10μm
110μm
*Fig. 7*

POLYMER MATRIX COMPOSITES COMPRISING FUNCTIONAL PARTICLES AND METHODS OF MAKING THE SAME

CROSS REFERENCE TO RELATED APPLICATIONS

This application is a national stage filing under 35 U.S.C. 371 of PCT/IB2018/058999, filed Nov. 15, 2018, which claims the benefit of U.S. Provisional Patent Application No. 62/587,041, filed Nov. 16, 2017, the disclosure of which is incorporated by reference herein its entirety.

BACKGROUND

Chromatographic resins are widely used within the biotechnology industry for the large-scale separation and/or purification of various biological molecules (e.g., proteins, enzymes, vaccines, DNA, and RNA). Column chromatography for purifications conducted using a high flow rate is subject to particle size and rigorous particle packing techniques to prevent the bed from cracking causing contamination bypass. If the average size of the chromatographic resin particles is less than about 40 micrometers, the back pressure in a chromatographic column filled with the particles may become unacceptably large, especially for the large columns useful for the purification or separation of large biomolecules. Although the average particle size may be as large as 2000 micrometers, the typical average particle size is no greater than 200 micrometers. If the average particle size is larger than about 200 micrometers, the efficiency of the chromatographic process may be low, especially for the purification or separation of large biomacromolecules (e.g., proteins) that often have low diffusion rates into the pores of the resin. For example, to achieve the same degree of separation or purity with larger resins that can be obtained using resins of 40 to 200 micrometers, a greater amount of the resin, a longer chromatographic column, a slower flow rate, or a combination thereof may be needed.

SUMMARY

In one aspect, the present disclosure describes a polymer matrix composite comprising:

a porous polymeric network structure; and a plurality of functional particles distributed within the polymeric network structure, wherein the polymer matrix composite has an air flow resistance at 25° C., as measured by the "Air Flow Resistance Test" described in the Examples, of less than 300 seconds/50 cm$^3$/500 micrometers (in some embodiments, less than 250 seconds/50 cm$^3$/500 micrometers, 200 seconds/50 cm$^3$/500 micrometers, 100 seconds/50 cm$^3$/500 micrometers, 50 seconds/50 cm$^3$/500 micrometers, 25 seconds/50 cm$^3$/500 micrometers, 20 seconds/50 cm$^3$/500 micrometers, 15 seconds/50 cm$^3$/500 micrometers, 10 seconds/50 cm$^3$/500 micrometers, or even less than 5 seconds/50 cm$^3$/500 micrometers). "Functional particles," as used herein, refer to particles comprising at least one functional group G capable of providing at least one of an absorbing, adsorbing, complexing, catalyzing, separating, or reagent function to the particle.

In another aspect, the present disclosure describes a first method of making polymer matrix composites described herein, the method comprising:

combining (e.g., mixing or blending) a thermoplastic polymer, a solvent, and a plurality of functional particles to provide a slurry;

forming the slurry in to an article (e.g., a layer);

heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent of the thermoplastic polymer, based on the total weight of the thermoplastic polymer; and inducing phase separation of the thermoplastic polymer from the solvent to provide the polymer matrix composite.

In another aspect, the present disclosure describes a second method of making polymer matrix composites described herein, the method comprising:

combining (e.g., mixing or blending) a thermoplastic polymer, a solvent for the thermoplastic polymer, and a plurality of functional particles to form a suspension of functional particles in a miscible thermoplastic polymer-solvent solution;

inducing phase separation of the thermoplastic polymer from the solvent; and removing at least a portion of the solvent to provide the polymer matrix composite.

"Miscible" as used herein refers to the ability of substances to mix in all proportions (i.e., to fully dissolve in each other at any concentration), forming a solution, wherein for some solvent-polymer systems heat may be needed for the polymer to be miscible with the solvent. By contrast, substances are immiscible if a significant proportion does not form a solution. For example, butanone is significantly soluble in water, but these two solvents are not miscible because they are not soluble in all proportions.

"Phase separation," as used herein, refers to the process in which particles are uniformly dispersed in a homogeneous polymer-solvent solution that is transformed (e.g., by a change in temperature or solvent concentration) into a continuous three-dimensional polymer matrix composite. In the first method, the desired article is formed before the polymer becomes miscible with the solvent and the phase separation is a thermally induced phase separation (TIPS) process. In the second method, the polymer is miscible with the solvent before the desired article is formed. In the second method, phase separation is achieved via solvent induced phase separation (SIPS) using a wet or dry process, or thermally induced phase separation methods.

In the SIPS wet process, the solvent dissolving the polymer is exchanged with a nonsolvent to induce phase separation. The new exchanging solvent in the system becomes the pore former for the polymer. In the SIPS dry process, the solvent dissolving the polymer is evaporated to induce phase separation. In the dry process, a nonsolvent is also solubilized in the solution by the solvent dissolving the polymer. This nonsolvent for the polymer becomes the pore former for the polymer as the solubilizing solvent evaporates. The process is considered a "dry process" because no additional exchange liquids are used. The nonsolvent is also normally volatile but has a boiling point at least 30° C. lower than the solvent.

In the TIPS process, elevated temperature is used to make a nonsolvent become a solvent for the polymer, then the temperature is lowered returning the solvent to a nonsolvent for the polymer. Effectively, the hot solvent becomes the pore former when sufficient heat is removed and it loses its solvating capacity. The solvent used in the thermal phase separation process can be volatile or nonvolatile.

Surprisingly, in the first method to make a polymer matrix composite, the relatively high particle loadings allow a slurry to be made that can be shaped into a layer, that maintains its form as the solvent is heated to become miscible with the polymer. The solvent used is normally volatile and is later evaporated. In the second method using TIPS process to make a polymer matrix composite, the solvent used is normally nonvolatile. In the second method to make a polymer matrix composite by the wet or dry SIPS process, the solvents are normally nonvolatile for the wet process and volatile for the dry process.

Typically, the maximum particle loading that can be achieved in traditional particle-filled composites (e.g., dense polymeric films and adhesives), is not more than about 40 to 60 vol. %, based on the volume of the particles and binder. Incorporating more than 6 vol. % particles into traditional particle-filled composites typically is not achievable because such highly particle-loaded materials cannot be processed via coating or extrusion methods and/or the resulting composite becomes very brittle. Conventional composites also typically fully encapsulate the particles with binder preventing access to the particle surfaces and minimizing potential particle-to-particle contact. Surprisingly, the high levels of solvent and the phase-separated morphologies, obtained with the methods described herein enable relatively high particle loadings with relatively low amounts of high molecular weight binder. The high particle loading also helps minimize the formation of thin non-porous polymer layer that can form during phase separation. Moreover, the polymer matrix composites described herein are relatively flexible, and tend not to shed particles. Although not wanting to be bound by theory, it is believed that another advantage of embodiments of polymer matrix composites described herein, is that the particles are not fully coated with binder, enabling a high degree of particle surface contact without masking due to the porous nature of the binder. The porous nature of the composite matrix permits hydrodynamic flow or fast diffusion through the particles interstitial pores. Slower diffusive transport typically occurs through smaller pores of porous particle media. The high open surface area of retained particles reduces the slow diffusive transport effects helping to provide high resolution and separation capacity like what is typically found with depth filter media. The high molecular weight binder also does not readily flow in the absence of solvent, even at elevated temperatures (e.g., 135° C.) making steam sterilization possible.

Polymer matrix composites described herein are useful, for example, as a filter or purification device (e.g., as absorbents, as complexing agents, as enzyme or other protein bearing supports), or as chromatographic articles. Polymer matrix composites described herein may be reusable or disposable, depending on the particular application.

In some embodiments, polymer matrix composites described herein, can be used to address deficiencies in conventional column chromatography methods that have limited practical particle size options. In some embodiments, polymer matrix composites described herein, can provide relatively high particle volumes with relatively large surface area access to the functional particles. Such polymer matrix composites may, for example, be in the form of a layer(s) or monolith form, and thereby bypassing inherent problems of using particles in packed bed chromatography columns.

BRIEF DESCRIPTION OF THE DRAWINGS

FIGS. 4A and 4B, show scanning electron microscope (SEM) micrographs of cross-sections of an exemplary polymer matrix composite (Example 1) described herein.

FIG. 6, show scanning electron microscope (SEM) micrographs of cross-sections of an exemplary polymer matrix composite (Example 3) described herein.

FIG. 7, show scanning electron microscope (SEM) micrographs of cross-sections of an exemplary polymer matrix composite (Example 4) described herein.

DETAILED DESCRIPTION

Figure 1:
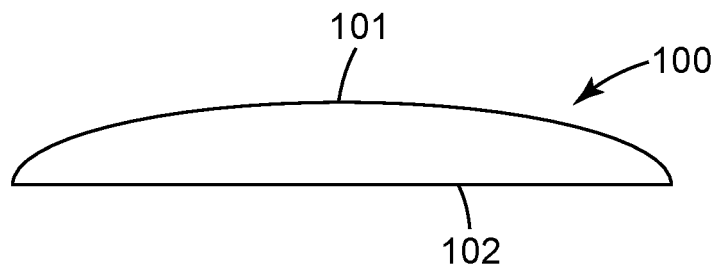
FIG. 1 is a schematic of an exemplary polymer matrix composite described herein.

In some embodiments, the functional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the functional particles and the polymer (excluding any solvent).

Functional particles, by virtue of the presence of a functional group(s) G, are capable of interacting with target species present within a fluid or gas that they are contacted with. The particles may be organic or inorganic, porous or nonporous, and spherical or non-spherical, or a combination (s) thereof depending on the end use "function" for which they are intended. The particles are typically polymeric, although not necessarily so (e.g., they may be metal or glass). The functional group(s) G may be directly attached to the particle surface, or may be attached to a linker group which in turn is attached to the particle. Group(s) G may be incorporated into the particle during its synthesis, or may be attached to the particle after its preparation, by a variety of methods that are well known in the art.

Exemplary functional particles include chromatographic particles (e.g., those that are useful for the purification of chemical or biological species). Exemplary chromatographic particles include organic and inorganic particles that comprise functional groups that can be used for ion exchange, affinity, reversed-phase, normal phase, size exclusion, multi-modal, hydrophobic interaction, metal affinity, metal chelate, and chiral separations. Exemplary functional particles, including chromatographic particles, are available, for example, from Bio-Rad, Hercules, Calif. (e.g., under trade designations "UNOSPHERE," "AFFIGEL," "AFFI-PREP," "MACRO-PREP," "CFT," and "CHT"), GE Healthcare, Pittsburgh, Pa. (e.g., under trade designations "CAPTO," "HITRAP," "MABSELECT," "SEPHACRYL," "SEPHADEX," "SEPHAROSE," "SUPERDEX," and "SUPEROSE"), Millipore Sigma, St. Louis, Mo. (e.g., under trade designations "ESHMUNO," "PROSEP," "FRACTOGEL," "PHARMPREP," "LICHROPREP," and "FLORISIL," as well as standard silica gel and alumina particles), Tosoh Biosciences, Tokyo, Japan (e.g., under trade designations "TSKGEL" and "TOYOPEARL"), Pall, Port Washington, N.Y. (e.g., under trade designations "HYPERD," "HYPERCEL," "KANEKA," "TRI-SACRYL", and "ULTRAGEL"), Mitsubishi Chemical Corporation, Tokyo, Japan (e.g., under the trade designation "DIAION"), and Thermo-Fisher, Waltham, Mass. (e.g., under trade designations "POROS," "CAPTURESELECT," and "ULTRALINK").

Chromatographic particles can also be made by techniques known in the art (see, e.g., U.S. Pat. No. 5,292,840 (Heilmann et al.), U.S. Pat. No. 6,379,952 (Rasmussen et al.), U.S. Pat. No. 7,674,835 (Rasmussen et al.), U.S. Pat. No. 7,674,836 (Rasmussen et al.), U.S. Pat. No. 8,367,198 (Wickert et al.), U.S. Pat. No. 8,592,493 (Shannon et al.), U.S. Pat. No. 8,710,111 (Wickert et al.), U.S. Pat. No. 9,018,267 (Shannon et al.), and U.S. Pat. No. 9,056,316 (Lawson et al.), the disclosures of which are incorporated herein by reference. Exemplary functional particles also include directly covalently reactive particles (see, e.g., U.S. Pat. No. 5,993,935 (Rasmussen et al.), the disclosure of which is incorporated herein by reference).

Exemplary functional particles also include water retentive zwitterionic gel electrolyte functionalized particles that are useful for antifouling applications. Functionalized particle can be grafted with both positive and negative charge species to form polyelectrolyte analytes.

Exemplary functional particles also include high surface area catalytic particles featuring deposited nanogold catalyst. Nanogold deposited on high surface area $TiO_2$ particles will catalyze carbon monoxide to carbon dioxide, hydrogen to water, and formaldehyde to carbon dioxide and water.

Exemplary functional particles also include low surface area catalytic particles featuring deposited nanogold catalyst that will preferentially oxidize carbon monoxide to carbon dioxide. Such selective reactions are useful for methanol reformation where it is desirable to oxidize the CO but not $H_2$ (e.g., for fuel cells) (see, e.g., U.S. Pat. No. 8,314,046 (Brady et al.) and U.S. Pat. No. 7,955,570 (Insley et al.), the disclosures of which are incorporated herein by reference).

Exemplary functional particles also include nanosilver or nanosilver coated particles that will have antimicrobial properties. They can also act as an indicator by turning black in the presence of hydrogen sulfide.

Other exemplary functional particles include guanidine-functional particles. Guanidine functional particles are useful for capturing biological species because they maintain ionic interactions even in the presence of high ionic strength. Useful guanidine functional particles include those prepared from guanidine functional silanes (see, e.g., U.S. Pat. No. 9,657,038 (Griesgraber et al.), U.S. Pat. Pub. No. 2018/0038862 (Kshirsagar et al.), and PCT Pub. No. 2016/149233, published Sep. 22, 2016, and those prepared by crosslinking guanidine functional polyethyleneimine G-PEI (see, e.g., U.S. Pat. Pub. No. 2017/0049926 (Langer-Anderson et al.)), the disclosures of which are incorporated by reference).

In those embodiments in which the functional particles are porous, it may be advantageous to use particles with an average particle size in the 1 to 20 micrometers size range, as this tends to shorten the residence time needed for target species to diffuse into contact with functional groups G.

Exemplary sizes of the functional particles range from 100 s of nanometers to 100 s of micrometers in size. Exemplary shapes of the functional particles include irregular, platy, acicular, and spherical shapes, as well as agglomerated forms. Agglomerates can range in size, for example, from a few micrometers up to and including a few millimeters.

In some embodiments, the functional particles have an average particle size in a range (average length of longest dimension) from 0.1 to 5000 (in some embodiments, in a range from 1 to 500, 1 to 120, 40 to 200, or even 5 to 60) micrometers. Particles that have internal porosity can be very desirable because of the increased surface area and potential for more active G moieties for purification. Examples of such large pore macro particles include those described, for example, in U.S. Pat. No. 6,423,666 (Liao et al.). Capacity can be determined by measuring the amount of a charged material that can be adsorbed on the ion exchange particles. An advantage of using large pore macro particles may be higher flux and reduced dwell time during filtration.

In some embodiments, the functional particles comprise first and second, different functional particles (i.e., hydrophobic interaction or cationic or anionic or affinity) creating a mixed mode separation media. In some embodiments, the first functional particles comprise a coating or particle derived from an amino (meth)acrylate monomer or a derivative thereof, and the second functional particles comprise hydrophobic functionality as found with amino acids of tryptophan, phenylalanine, and leucine. In some embodiments, the first functional particles comprise anion exchange particles, and the second functional particles comprise cation exchange particles. In some embodiments, the mixed mode functionality can be coated or polymerized on the same particle. In some embodiments, ionic monomers comprising a weak base, a strong base, a salt of a weak base, a salt of a strong base, or combinations thereof can be used in the preparation of ion exchange particles. Mixed mode media can sometimes provide increased retention or separation ability for target species over media with only one mode of interaction. More than one different functional particle may sometimes be used for the interaction with two or more different target species at the same time.

In some embodiments, the first functional particles have an average particle size (average length of longest dimension) in a range from 0.1 to 5000 (in some embodiments, in a range from 1 to 500, 1 to 120, 40 to 200, or even 5 to 60) micrometers and the second functional particles have an average particle size (average length of longest dimension) in a range from 0.1 to 5000 (in some embodiments, in a range from 1 to 500, 1 to 120, 40 to 200, or even 5 to 60) micrometers.

In some embodiments, the first functional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, and the second functional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the first and second functional particles.

In some embodiments, polymer matrix composites described herein further comprise nonfunctional particles (i.e., are not functional particles). In some embodiments, the nonfunctional particles comprise polyamide particles (available, for example, under the trade designation "ORGASOL" from Arkema, Inc., King of Prussia, Pa.) to be used as spacers to prevent pore collapse from the heating or drying steps with particles that are sensitive to hydrocarbon diluent or heat needed to dissolve the polymeric binder. The nonfunctional particles typically do not participate in removing target moieties from at least one of a fluid or gas stream.

In some embodiments, the nonfunctional particles have an average particle size (average length of longest dimension) in a range from 0.1 to 5000 (in some embodiments, in a range from 1 to 500, 1 to 120, 40 to 200, or even 5 to 60) micrometers.

In some embodiments, the nonfunctional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the functional particles in the polymer matrix composite.

In some embodiments, polymer matrix composites described herein have a density of at least 0.1 (in some embodiments, at least 0.15, 0.2, 0.25, 0.5, or even at least 1; in some embodiments, in a range from 0.1 to 2, 0.1 to 1.5, 0.1 to 1, or even 0.1 to 0.5) g/cm$^3$.

In some embodiments, polymer matrix composites described herein have a porosity of at least 5 (in some embodiments, in a range from 5 to 90, 10 to 90, 20 to 80, or even 30 to 60) percent.

In some embodiments, polymer matrix composites described herein have a surface area of at least 1 (in some embodiments, at least 5, 10, 15, 20, 30, 40, or even at least 50; in some embodiments, in a range from 50 to 500, or even 200 to 800) m$^2$/g. An advantage of larger surface areas may be increased binding capacity. Exemplary particles with relatively large available surface area include those reported in U.S. Pat. No. 7,582,684 (Rasmussen et al.), the disclosure of which is incorporated herein by reference.

The polymeric network structure may be described as a porous polymeric network or a porous phase separated polymeric network. Generally, the porous polymeric network (as-made) includes an interconnected porous polymeric network structure comprising a plurality of interconnected morphologies (e.g., at least one of fibrils, nodules, nodes, open cells, closed cells, leafy laces, strands, nodes, spheres, or honeycombs). The interconnected polymeric structures may adhere directly to the surface of the particles and act as a binder for the particles. In this regard, the space between adjacent particles (e.g., particles or agglomerate particles) may include porous polymeric network structures as opposed to a solid matrix material, thereby providing desired porosity.

In some embodiments, the polymeric network structure may include a 3-dimensional reticular structure that includes an interconnected network of polymeric fibrils. In some embodiments, individual fibrils have an average width in a range from 10 nm to 100 nm (in some embodiments, in a range from 100 nm to 500 nm, or even 500 nm to 5 micrometers).

In some embodiments, the particles are dispersed within the polymeric network structure, such that an external surface of the individual units of the particles (e.g., individual particles or individual agglomerate particles) is mostly uncontacted, or uncoated, by the polymeric network structure. In this regard, in some embodiments, the average percent areal coverage of the polymeric network structure on the external surface of the individual particles (i.e., the percent of the external surface area that is in direct contact with the polymeric network structure) is not greater than 50 (in some embodiments, not greater than 40, 30, 25, 20, 10, 5, or even not greater than 1) percent, based on the total surface area of the external surfaces of the individual particles.

In some embodiments, the polymeric network structure does not penetrate internal porosity or internal surface area of the individual particles (e.g., individual particles or individual agglomerate particles are mostly uncontacted, or uncoated, by the polymeric network structure).

In some embodiments, the polymeric network structure may comprise, consist essentially of, or consist of at least one thermoplastic polymer. Exemplary thermoplastic polymers include polyurethane, polyester (e.g., polyethylene terephthalate, polybutylene terephthalate, and polylactic acid), polyamide (e.g., nylon 6, nylon 6,6, nylon 12 and polypeptide), polyether (e.g., polyethylene oxide and polypropylene oxide), polycarbonate (e.g., bisphenol-A-polycarbonate), polyimide, polysulphone, polyethersulphone, polyphenylene oxide, polyacrylate (e.g., thermoplastic polymers formed from the addition polymerization of monomer(s) containing an acrylate functional group), polymethacrylate (e.g., thermoplastic polymers formed from the addition polymerization of monomer(s) containing a methacrylate functional group), polyolefin (e.g., polyethylene and polypropylene), styrene and styrene-based random and block copolymer, chlorinated polymer (e.g., polyvinyl chloride), fluorinated polymer (e.g., polyvinylidene fluoride; copolymers of tetrafluoroethylene, hexafluoropropylene and vinylidene fluoride; copolymers of ethylene, tetrafluoroethylene; hexafluoropropylene; and polytetrafluoroethylene), and copolymers of ethylene and chlorotrifluoroethylene. In some embodiments, thermoplastic polymers include homopolymers or copolymers (e.g., block copolymers or random copolymers). In some embodiments, thermoplastic polymers include a mixture of at least two thermoplastic polymer types (e.g., a mixture of polyethylene and polypropylene or a mixture of polyethylene and polyacrylate). In some embodiments, the polymer may be at least one of polyethylene (e.g., ultra-high molecular weight polyethylene), polypropylene (e.g., ultra-high molecular weight polypropylene), polylactic acid, poly(ethylene-co-chlorotrifluoroethylene) and polyvinylidene fluoride. In some embodiments, the thermoplastic polymer is a single thermoplastic polymer (i.e., it is not a mixture of at least two thermoplastic polymer types). In some embodiments, the thermoplastic polymers consist essentially of, or consist of polyethylene (e.g., ultra-high molecular weight polyethylene).

In some embodiments, the thermoplastic polymer used to make the polymer matrix composites described herein are particles having a particle size less than 1000 (in some embodiments, in a range from 1 to 10, 10 to 30, 30 to 100, 100 to 200, 200 to 500, 500 to 1000) micrometers.

In some embodiments, the porous polymeric network structure comprises at least one of polyacrylonitrile, polyurethane, polyester, polyamide, polyether, polycarbonate, polyimide, polysulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

In some embodiments, the porous polymeric network structure comprises a polymer having a number average molecular weight in a range from $5\times10^4$ to $1\times10^7$ (in some embodiments, in a range from $1\times10^6$ to $8\times10^6$, $2\times10^6$ to $6\times10^6$, or even $3\times10^6$ to $5\times10^6$) g/mol. For purposes of the present disclosure, the number average molecular weight can be measured by known techniques in the art (e.g., gel permeation chromatography (GPC)). GPC may be conducted in a suitable solvent for the thermoplastic polymer, along with the use of narrow molecular weight distribution polymer standards (e.g., narrow molecular weight distribution polystyrene standards). Thermoplastic polymers are generally characterized as being partially crystalline, exhibiting a melting point. In some embodiments, the thermoplastic polymer may have a melting point in a range from 120 to 350 (in some embodiments, in a range from 120 to 300, 120 to 250, or even 120 to 200) ° C. The melting point of the thermoplastic polymer can be measured by known techniques in the art (e.g., the on-set temperature measured in a differential scanning calorimetry (DSC) test, conducted with a 5 to 10 mg sample, at a heating scan rate of 10° C./min., while the sample is under a nitrogen atmosphere).

In some embodiments, the polymeric network structure is a continuous network structure (i.e., the polymer phase comprises a structure that is open cell with continuous voids or pores forming interconnections between the voids, extending throughout the structure). In some embodiments, at least 2 (in some embodiments, at least 5, 10, 20, 30, 40, 50, 60, 70, 80, 90, 95, or even, 100) percent of the polymer network structure, by volume, may be a continuous polymer network structure. It should be noted that for purposes of the present disclosure, the portion of the volume of the polymer matrix composite made up of the particles is not considered part of the polymeric network structure. In some embodiments, the polymer network extends between two particles forming a network of interconnected particles.

The solvent (e.g., a first solvent) is selected such that it forms a miscible polymer-solvent solution. In some cases, elevated temperatures may be required to form the miscible polymer-solvent solution. The solvent may be a blend of at least two individual solvents. In some embodiments, when the polymer is a polyolefin (e.g., at least one of polyethylene and polypropylene), the solvent may be, for example, at least one of mineral oil, tetralin, decalin, orthodichlorobenzene, cyclohexane-toluene mixture, dodecane, paraffin oil/wax, kerosene, isoparaffinic fluids, p-xylene/cyclohexane mixture (1/1 wt./wt.), camphene, 1,2,4 trichlorobenzene, octane, orange oil, vegetable oil, castor oil, or palm kernel oil. In some embodiments, when the polymer is polyvinylidene fluoride, the solvent may be, for example, at least one of ethylene carbonate, propylene carbonate, or 1,2,3 triacetoxypropane. The solvent may be removed, for example, by evaporation. High vapor pressure solvents being particularly suited to this method of removal. If, however, the first solvent has a low vapor pressure, it may be desirable to have a second solvent, of higher vapor pressure, to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethylnonafluorobutyl ether ($C_4F_9OC_2H_5$), and trans-1,2-dichloroethylene (available, for example, under the trade designation "NOVEC 72DE" from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.), may be used as the second solvent. In some embodiments, when ethylene carbonate is used as the first solvent, water may be used as the second solvent.

In some embodiments, small quantities of other additives can be added to the polymer matrix composite to impart additional functionality or act as processing aids. These include viscosity modifiers (e.g., fumed silica, block copolymers, and wax), plasticizers, thermal stabilizers (e.g., such as available, for example, under the trade designation "Irganox 1010" from BASF, Ludwigshafen, Germany), antimicrobials (e.g., silver and quaternary ammonium), flame retardants, antioxidants, dyes, pigments, and ultraviolet (UV) stabilizers.

In some embodiments, polymer matrix composites described herein, are in the form of a layer having a thickness in a range from 50 to 7000 micrometers, wherein the thickness excludes the height of any protrusions extending from the base of the layer.

In some embodiments, the porous polymeric network structure is produced by an induced phase separation of a miscible thermoplastic polymer-solvent solution. In some embodiments, induced phase separation is at least one of thermally induced phase separation or solvent induced phase separation.

First Method

A first method of making polymer matrix composites described herein comprises:

combining (e.g., mixing or blending) a thermoplastic polymer, a solvent, and a plurality of functional particles to provide a slurry;

forming the slurry in to an article (e.g., a layer);

heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent of the thermoplastic polymer, based on the total weight of the thermoplastic polymer; and inducing phase separation of the thermoplastic polymer from the solvent to provide the polymer matrix composite.

If the particles are dense, typically the slurry is continuously mixed or blended to prevent or reduce settling or separation of the polymer and/or particles from the solvent. In some embodiments, the slurry is degassed using techniques known in the art to remove entrapped air.

The slurry can be formed in to an article using techniques known in the art, including knife coating, roll coating (e.g., roll coating through a defined nip), and coating through any number of different dies having the appropriate dimensions or profiles.

In some embodiments of the first method, combining is conducted at at least one temperature below the melting point of the polymer and below the boiling point of the solvent.

In some embodiments of the first method, heating is conducted at at least one temperature above the melting point of the miscible thermoplastic polymer-solvent solution, and below the boiling point of the solvent.

In some embodiments of the first method, inducing phase separation is conducted at at least one temperature less than the melting point of the polymer in the slurry. Although not wanting to be bound, it is believed that in some embodiments, solvents used to make a miscible blend with the polymer can cause melting point depression in the polymer. The melting point described herein includes below any melting point depression of the polymer solvent system.

In some embodiments of the first method, the solvent is a blend of at least two individual solvents. In some embodiments, when the polymer is a polyolefin (e.g., at least one of polyethylene or polypropylene), the solvent may be at least one of mineral oil, tetralin, decalin, orthodichlorobenzene, cyclohexane-toluene mixture, dodecane, paraffin oil/wax, kerosene, p-xylene/cyclohexane mixture (1/1 wt./wt.), camphene, 1,2,4 trichlorobenzene, octane, orange oil, vegetable oil, castor oil, or palm kernel oil. In some embodiments, when the polymer is polyvinylidene fluoride, the solvent is at least one of ethylene carbonate, propylene carbonate, or 1,2,3 triacetoxypropane.

In some embodiments of the first method the polymeric network structure may be formed during phase separation. In some embodiments, the polymeric network structure is provided by an induced phase separation of a miscible thermoplastic polymer-solvent solution. In some embodiments, the phase separation is induced thermally (e.g., via thermally induced phase separation (TIPS) by quenching to a lower temperature than used during heating). Cooling can be provided, for example, in air, liquid, or on a solid interface, and varied to control the phase separation. The polymeric network structure may be inherently porous (i.e., have pores). The pore structure may be open, enabling fluid communication from an interior region of the polymeric network structure to an exterior surface of the polymeric network structure and/or between a first surface of the polymeric network structure and an opposing second surface of the polymeric network structure.

In some embodiments of the method described herein, the weight ratio of solvent to polymer is at least 9:1. In some embodiments, the volume ratio of particles to polymer is at least 9:1. In some embodiments, and for ease of manufacturing, it may be desirable to form a layer at room temperature. Typically, during the layer formation using phase separation, relatively small pores are particularly vulnerable to collapsing during solvent extraction. The relatively high particle to polymer loading achievable by the methods described herein may reduce pore collapsing and yield a more uniform defect-free polymer matrix composite.

In some embodiments, the first method further comprises removing at least a portion (in some embodiments, at least 5, 10, 15, 20, 25, 30, 35, 40, 45, 50, 55, 60, 65, 70, 75, 80, 85, 90, 95, 96, 97, 98, 99, 99.5, or even 100 percent by weight of the solvent, based on the weight of the solvent in the formed article) of the solvent from the formed article, after inducing phase separation of the thermoplastic polymer from the solvent.

In some embodiments of the first method, at least 90 percent by weight of the solvent, based on the weight of the solvent in the formed article, is removed wherein the formed article, before removing at least 90 percent by weight of the solvent, based on the weight of the solvent in the formed article, of the solvent has a first volume, wherein the formed article, after removing at least 90 percent by weight of the solvent, based on the weight of the solvent in the formed article, has a second volume, and wherein the difference between the first and second volume (i.e., (the first volume minus the second volume) divided by the first volume times 100) is less than 10 (in some embodiments, less than 9, 8, 7, 6, 5, 4, 3, 2, 1, 0.75, 0.5, or even less than 0.3) percent. Volatile solvents can be removed from the polymer matrix composite, for example, by allowing the solvent to evaporate from at least one major surface of the polymer matrix composite. Evaporation can be aided, for example, by the addition of at least one of heat, vacuum, or air flow. Evaporation of flammable solvents can be achieved in a solvent-rated oven. If the first solvent, however, has a low vapor pressure, a second solvent, of higher vapor pressure, may be used to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethylnonafluorobutyl ether ($C_4F_9OC_2H_5$), and trans-1,2-dichloroethylene (available, for example, under the trade designation "NOVEC 72DE" from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.) may be used as the second solvent. In some embodiments, when ethylene carbonate is used as the first solvent, water may be used as the second solvent.

In some embodiments of the first method, the article has first and second major surfaces with ends perpendicular to the first and second major surfaces, and the ends are unrestrained (i.e., without the need for restraints during extraction or stretching) during the solvent removal. This can be done, for example, by drying a portion of a layer without restraint in an oven. Continuous drying can be achieved, for example, by drying a portion of a layer supported on a belt as it is conveyed through an oven. Alternatively, to facilitate removal of non-volatile solvents, for example, a portion of a layer can be continuously conveyed through a bath of compatible volatile solvent thereby exchanging the solvents and allowing the layer to be subsequently dried without restraint. Not all the non-volatile solvent, however, needs be removed from the layer during the solvent exchange. Small amounts of non-volatile solvents may remain and act as a plasticizer to the polymer.

In some embodiments of the first method, the formed, and phase separated article, after the solvent removal, has a porosity of at least 5 (in some embodiments, at least 10, 20, 30, 35, 40, 45, 50, 55, 60, 65, 70, 75, 80, 85, or even at least 90; in some embodiments, in a range from 25 to 90) percent. This porosity is caused by the phase separation of the polymer from the solvent which initially leaves no unfilled voids, as the pores in the polymer matrix composite are filled with solvent. After the solvent is completely or partly removed, or the article is stretched, void spaces in the polymer matrix composite are exposed. The particle-to-particle interactions can minimize the collapse or deformation of the porous polymer matrix composite from capillary-induced negative pressures from the solvent drying process.

In some embodiments of the first method, no solvent is removed from the formed article (even after inducing phase separation of the thermoplastic polymer from the solvent). This can be accomplished, for example, by using a non-volatile solvent (e.g., mineral oil or wax) and not completing the extraction/evaporation step. If unfilled porosity is required for the solvent containing composites, then they can optionally be stretched to open up pores within the polymer and solvent matrix.

Typically, it is desirable to remove the solvent to expose more functional surface area of the particles.

Second Method

A second method of making polymer matrix composites described herein comprises:

combining (e.g., mixing or blending) a thermoplastic polymer, a solvent for the thermoplastic polymer, and a plurality of functional particles to form a suspension of functional particles in a miscible thermoplastic polymer-solvent solution;

inducing phase separation of the thermoplastic polymer from the solvent; and removing at least a portion of the solvent to provide the polymer matrix composite.

In some embodiments, the second method further comprises adding the functional particles to the miscible polymer-solvent solution, prior to phase separation. The polymeric network structure may be formed during the phase separation of the process. In some embodiments, the polymeric network structure is provided via an induced phase separation of a miscible thermoplastic polymer-solvent solution. In some embodiments, the phase separation is induced thermally (e.g., via thermally induced phase separation (TIPS) by quenching to lower temperature), chemically (e.g., via solvent induced phase separation (SIPS) by substituting a poor solvent for a good solvent), or change in the solvent ratio (e.g., by evaporation of one of the solvents). Other phase separation or pore formation techniques known in the art, such as discontinuous polymer blends (also sometimes referred to as polymer assisted phase inversion (PAPI)), moisture induced phase separation, or vapor induced phase separation, can also be used. The polymeric network structure may be inherently porous (i.e., have pores). The pore structure may be open, enabling fluid communication from an interior region of the polymeric network structure to an exterior surface of the polymeric network structure and/or between a first surface of the polymeric network structure and an opposing second surface of the polymeric network structure.

In some embodiments of the second method, the polymer in the miscible thermoplastic polymer-solvent solution has a melting point, wherein the solvent has a boiling point, and wherein combining is conducted at at least one temperature above the melting point of the miscible thermoplastic polymer-solvent solution, and below the boiling point of the solvent.

In some embodiments of the second method, the polymer in the miscible thermoplastic polymer-solvent solution has a melting point, and wherein inducing phase separation is conducted at at least one temperature less than the melting point of the polymer in the miscible thermoplastic polymer-solvent solution. The thermoplastic polymer-solvent mixture may be heated to facilitate the dissolution of the thermoplastic polymer in the solvent. After the thermoplastic polymer has been phase separated from the solvent, at least a portion of the solvent may be removed from the polymer matrix composite using techniques known in the art, including evaporation of the solvent or extraction of the solvent by a higher vapor pressure, second solvent, followed by evaporation of the second solvent. In some embodiments, in a range from 10 to 100 (in some embodiments, in a range from 20 to 100, 30 to 100, 40 to 100, 50 to 100, 60 to 100, 70 to 100, 80 to 100, 90 to 100, 95 to 100, or even 98 to 100) percent by weight of the solvent, and second solvent, if used, may be removed from the polymer matrix composite.

The solvent is typically selected such that it is capable of dissolving the polymer and forming a miscible polymer-solvent solution. Heating the solution to an elevated temperature may facilitate the dissolution of the polymer. In some embodiments, combining the polymer and solvent is conducted at at least one temperature in a range from 20° C. to 350° C. The functional particles may be added at any or all of the combining, before the polymer is dissolved, after the polymer is dissolved, or at any time there between.

In some embodiments, the solvent is a blend of at least two individual solvents. In some embodiments, when the polymer is a polyolefin (e.g., at least one of polyethylene or polypropylene), the solvent may be at least one of mineral oil, paraffin oil/wax, camphene, orange oil, vegetable oil, castor oil, or palm kernel oil. In some embodiments, when the polymer is polyvinylidene fluoride, the solvent is at least one of ethylene carbonate, propylene carbonate, or 1,2,3 triacetoxypropane.

In some embodiments, the solvent may be removed, for example, by evaporation, high vapor pressure solvents being particularly suited to this method of removal. If the first solvent, however, has a low vapor pressure, a second solvent, of higher vapor pressure, may be used to extract the first solvent, followed by evaporation of the second solvent. For example, in some embodiments, when mineral oil is used as a first solvent, isopropanol at elevated temperature (e.g., about 60° C.) or a blend of methyl nonafluorobutyl ether ($C_4F_9OCH_3$), ethylnonafluorobutyl ether ($C_4F_9OC_2H_5$), and trans-1,2-dichloroethylene (available under the trade designation "NOVEC 72DE" from 3M Company, St. Paul, Minn.) may be used as a second solvent to extract the first solvent, followed by evaporation of the second solvent. In some embodiments, when at least one of vegetable oil or palm kernel oil is used as the first solvent, isopropanol at elevated temperature (e.g., about 60° C.) may be used as the second solvent. In some embodiments, when ethylene carbonate is used as the first solvent, water may be used as the second solvent.

Typically, in the phase separation process, the blended mixture is formed in to a layer prior to solidification of the polymer. The polymer is dissolved in solvent (that allows formation of miscible thermoplastic-solvent solution), and the functional particles dispersed to form a blended mixture, that is formed into an article (e.g., a layer), followed by phase separation (e.g., temperature reduction for TIPS, solvent evaporation or solvent exchange with nonsolvent for SIPS). The layer-forming may be conducted using techniques known in the art, including knife coating, roll coating (e.g., roll coating through a defined nip), and extrusion (e.g., extrusion through a die (e.g., extrusion through a die having the appropriate layer dimensions (i.e., width and thickness of the die gap))). In one exemplary embodiment, the mixture has a paste-like consistency and is formed in to a layer by extrusion (e.g., extrusion through a die having the appropriate layer dimensions (i.e., width and thickness of the die gap)). After forming the slurry in to a layer, where the thermoplastic polymer is miscible in its solvent, the polymer is then induced to phase separate. Several techniques may be used to induce phase separation, including at least one of thermally induced phase separation or solvent induced phase separation. Thermally induced phase separation may occur when the temperature at which induced phase separation is conducted is lower than the combining temperature of the polymer, solvent, and functional particles. This may be achieved by cooling the miscible polymer-solvent solution, if combining is conducted near room temperature, or by first heating the miscible polymer-solvent solution to an elevated temperature (either during combining or after combining), followed by decreasing the temperature of the miscible polymer-solvent solution, thereby inducing phase separation of the thermoplastic polymer. In both cases, the cooling may cause phase separation of the polymer from the solvent. Solvent induced phase separation can be conducted by adding a second solvent, a poor solvent for the polymer, to the miscible polymer-solvent solution or may be achieved by removing at least a portion of the solvent of the miscible polymer-solvent solution (e.g., evaporating at least a portion of the solvent of the miscible polymer-solvent solution), thereby inducing phase separation of the polymer. Combination of phase separation techniques (e.g., thermally induced phase separation and solvent induced phase separation), may be employed. Thermally induced phase separation may be advantageous, as it also facilitates the dissolution of the polymer when combining is conducted at an elevated temperature. In some embodiments, thermally inducing phase separation is conducted at at least one temperature in a range from 5 to 300 (in some embodiments, in a range from 5 to 250, 5 to 200, 5 to 150, 15 to 300, 15 to 250, 15 to 200, 15 to 130, or even 25 to 110) ° C. below the combining temperature.

After inducing phase separation, at least a portion of the solvent may be removed, thereby forming a porous polymer matrix composite layer having a polymeric network structure and a functional particle distributed within the thermoplastic polymer network structure. Optionally, after inducing phase separation, the solvent filled structure is stretched, thereby forming a porous polymer matrix composite layer having a polymeric network structure, solvent, and particles distributed within the thermoplastic polymer network structure.

The solvent may be removed by evaporation, high vapor pressure solvents being particularly suited to this method of removal. If the first solvent, however, has a low vapor pressure, a second solvent, of higher vapor pressure, may be used to extract the first solvent, followed by evaporation of the second solvent. In some embodiments, in a range from 10 to 100 (in some embodiments, in a range from 20 to 100, 30 to 100, 40 to 100, 50 to 100, 60 to 100, 70 to 100, 80 to 100, 90 to 100, 95 to 100, or even 98 to 100) percent by weight of the solvent, and second solvent, if used, may be removed from the polymer matrix composite.

In some embodiments, the first and second methods further comprise at least one of stretching or compressing the polymer matrix composite. That is, after inducing phase separation, the formed polymeric network structure may be stretched or compressed, for example, to tune the air flow resistance of the polymer matrix composite. Stretching or compression of the polymer matrix composite may be achieved, for example, by conventional calendaring or tentering processes known in the art.

In some embodiments, where the network structure is plastically deformed by at least a compressive force, vibratory energy may be imparted during the application of the compressive force. In some of these embodiments, the polymer composite is in the form of a strip of indefinite length, and the applying of a compressive force step is performed as the strip passes through a nip. A tensile loading may be applied during passage through such a nip. For example, the nip may be formed between two rollers, at least one of which applies the vibratory energy; between a roller and a bar, at least one of which applies the vibratory energy; or between two bars, at least one of which applies the vibratory energy. The applying of the compressive force and the vibratory energy may be accomplished in a continuous roll-to-roll fashion, or in a step-and-repeat fashion. In other embodiments, the applying a compressive force step is performed on a discrete layer between, for example, a plate and a platen, at least one of which applies the vibratory energy. In some embodiments, the vibratory energy is in the ultrasonic range (e.g., 20 kHz), but other ranges are considered to be suitable. For further details regarding plastically deforming the network structure, see application having U.S. Ser. No. 62/578,732, filed Oct. 30, 2017, the disclosure of which is incorporated by reference.

In some embodiments, polymer matrix composite described herein can be wrapped around a 0.5 mm (in some embodiments, 0.6 mm, 0.7 mm, 0.8 mm, 0.9 mm, 1 mm, 2 mm, 3, mm, 4 mm, 5 mm, 1 cm, 5 cm, 10 cm, 25 cm, 50 cm, or even 1 meter) rod without breaking.

In some embodiments of both the first and second methods, polymeric matrix composites described herein, have first and second planar, opposed major surfaces. In some embodiments, polymer matrix composites described herein, have first and second opposed major surfaces, wherein the first major surface is nonplanar (e.g., curved). Referring to FIG. 1, exemplary polymer matrix composite described herein 100 has first and second opposed major surfaces 101, 102. First major surface 101 is nonplanar.

Planar and nonplanar major surfaces can be provided, for example, by coating or extruding the slurry onto a patterned substrate (e.g., a liner, a belt, a mold, or a tool). Alternatively, for example, a die with a shaped slot can be used to form nonplanar surfaces during the coating or extrusion process. Alternatively, for example, the structure can be formed after the phase separation has occurred before, and/or after, the solvent is removed by molding or shaping the layer with a patterned tool.

In some embodiments of both the first and second methods, polymer matrix composites described herein, have first protrusions extending outwardly from the first major surface, and in some embodiments, second protrusions extending outwardly from the second major surface. In some embodiments, the first protrusions are integral with the first major surface, and in some embodiments, the second protrusions are integral with the second major surface. Exemplary protrusions include at least one of a post, a rail, a hook, a pyramid, a continuous rail, a continuous multi-directional rail, a hemisphere, a cylinder, or a multi-lobed cylinder. In some embodiments, the protrusions have a cross-section in at least one of a circle, a square, a rectangle, a triangle, a pentagon, other polygons, a sinusoidal, a herringbone, or a multi-lobe.

Figure 2:
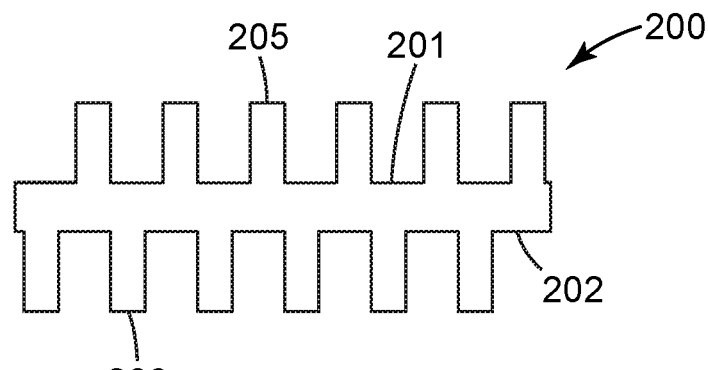
FIG. 2 is a schematic of another exemplary polymer matrix composite described herein.

Referring to FIG. 2, exemplary polymer matrix composite described herein 200 has first protrusions 205 extending outwardly from first major surface 201 and optional second protrusions 206 extending outwardly from second major surface 202.

Protrusions can be provided, for example, by coating or extruding between a patterned substrate (e.g., a liner, a belt, a mold, or a tool). Alternatively, a die with a shaped slot can be used to form protrusions during the coating or extrusion process. Alternatively, for example, the structure can be formed after the phase separation has occurred before and/or after the solvent is removed by molding or shaping the film between patterned tools.

Figure 3:
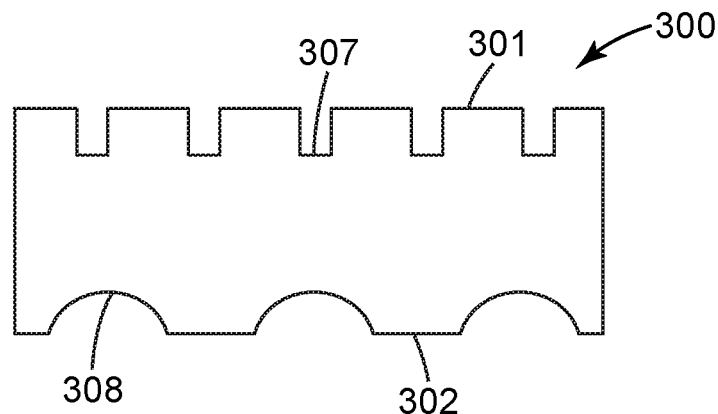
FIG. 3 is a schematic of another exemplary polymer matrix composite described herein.

In some embodiments of both the first and second methods, polymer matrix composite described herein have first depressions extending into the first major surface, and in some embodiments, second depressions extending into the second major surface. Exemplary depressions include at least one of a groove, a slot, an inverted pyramid, a hole (including a thru or blind hole), or a dimple. Referring to FIG. 3, exemplary polymer matrix composite described herein 300 has first depressions 307 extending into first major surface 301 and optional second depressions 308 extending into second major surface 302.

Depressions can be provided, for example, by coating or extruding between patterned substrate (e.g., a liner, a belt, a mold, or a tool). Alternatively, for example, a die with a shaped slot can be used to form depressions during the coating or extrusion process. Alternatively, for example, the structure can be formed after the phase separation has occurred, before and/or after, the solvent is removed by molding or shaping the film between patterned tools.

In some embodiments, polymer matrix composites described herein further comprise a reinforcement (e.g., attached to the polymer matrix composite, partial therein, and/or therein). Exemplary reinforcements include fibers, strands, nonwovens, woven materials, fabrics, mesh, and films. The reinforcement, for example, can be laminated to the polymer matrix composite thermally, adhesively, or ultrasonically. The reinforcement, for example, can be imbedded within the polymer matrix composite during the coating or extrusion process. The reinforcement, for example, can be between the major surfaces of the composite, on one major surface, or on both major surfaces. More than one type of reinforcement can be used.

Polymer matrix composites described herein are useful, for example, as a filter or purification device, as absorbants, as complexing agents, as enzyme or other protein bearing supports, or as chromatographic articles. Polymer matrix composites described herein may be reusable or disposable, depending on the particular application. For further details on uses in general, see, for example, U.S. Pat. No. 5,993,935 (Rasmussen et al.), the disclosure of which is incorporated herein by reference. The composites are useful, for, example, for removing microbial contamination from drinking water. For further details on removing microbial contamination from drinking water in general, see, for example, in application having U.S. Pat. Pub. No. US2018/0038862, published Feb. 8, 2018, and PCT Pub. No. 2016/149233, published Sep. 22, 2016, the disclosures of which are incorporated herein by reference.

Polymer matrix composites described herein may be useful, for example, as filter media for the selective binding and removal of target biomaterials or biological species (including relatively neutral or charged biomaterials (e.g., viruses and other microorganisms, acidic carbohydrates, proteins, nucleic acids, endotoxins, bacteria, cells, and cellular debris) from biological samples). Articles comprising the polymer matrix composites described herein may further comprise conventional components such as housings, holders, and adapters.

If desired, efficiency of binding and capture of biomaterials may be improved by using a plurality of stacked or layered, polymer matrix composites as a filter element. Thus, a filter element can comprise at least one layer of polymer matrix composite described herein. The individual layers of the filter element can be the same or different. The layers can vary in porosity, type of functional particle, and so forth. The filter element can further comprise an upstream prefilter layer and/or a downstream support layer. The individual layers can be planar or pleated, as desired.

Examples of suitable prefilter and support layer materials include any suitable porous membranes of polypropylene, polyester, polyamide, resin-bonded or binder-free fibers (e.g., glass fibers), and other synthetics (e.g., woven and nonwoven fleece structures); sintered materials (e.g., polyolefins, metals, and ceramics); yarns; filter papers (e.g., mixtures of fibers, cellulose, polyolefins, and binders); and polymer membranes.

Useful articles for biomaterial capture or filtration applications include a filter cartridge comprising one or more of the above-described filter elements, a filter assembly comprising one or more of the above-described filter elements and a filter housing. Filter types can include a plate and frame filter, plate filter, depth filter, cartridge filter, bag filter, capsule filter, cross flow filter, tangential flow filtration (TFF), or a chromatography device. The articles can be used in carrying out a method of capture or removal of a target biomaterial or biological species comprising (a) providing at least one article comprising at least one above-described filter element; and (b) allowing a moving biological solution containing a target biomaterial to impinge upon the upstream surface of the filter element for a time sufficient to effect binding of the target biomaterial.

EXEMPLARY EMBODIMENTS

1A. A polymer matrix composite comprising:
 a porous polymeric network structure; and
 a plurality of functional particles distributed within the polymeric network structure, wherein the polymer matrix composite has an air flow resistance at 25° C., as measured by the "Air Flow Resistance Test" described in the Examples, of less than 300 seconds/50 cm$^3$/500 micrometers (in some embodiments, less than 250 seconds/50 cm$^3$/500 micrometers, 200 seconds/50 cm$^3$/500 micrometers, 100 seconds/50 cm$^3$/500 micrometers, 50 seconds/50 cm$^3$/500 micrometers, 25 seconds/50 cm$^3$/500 micrometers, 20 seconds/50 cm$^3$/500 micrometers, 15 seconds/50 cm$^3$/500 micrometers, 10 seconds/50 cm$^3$/500 micrometers, or even less than 5 seconds/50 cm$^3$/500 micrometers).

2A. The polymer matrix composite of Exemplary Embodiment 1A, wherein the functional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the functional particles and the polymer (excluding any solvent).

3A. The polymer matrix composite of any preceding A Exemplary Embodiment, wherein the polymer matrix composite has a density in a range of at least 0.1 (in some embodiments, at least 0.15, 0.2, 0.25, 0.5, or even at least 1; in some embodiments, in a range from 0.1 to 2, 0.1 to 1.5, 0.1 to 1, or even 0.1 to 0.5) g/cm$^3$.

4A. The polymer matrix composite of any preceding A Exemplary Embodiment, wherein the polymer matrix composite has a porosity of at least 5 (in some embodiments, in a range from 5 to 90, 10 to 90, 20 to 80, or even 30 to 60) percent.

5A. The polymer matrix composite of any of preceding A Exemplary Embodiment, wherein the functional particles comprise first and second, different (i.e., having different functionality (e.g., different ion affinities or hydrophobic interaction)) functional particles.

6A. The polymer matrix composite of Exemplary Embodiment 5A, wherein the first functional particles comprise anion exchange particles, and wherein the second functional particles comprise cation exchange particles.

7A. The polymer matrix composite of either Exemplary Embodiment 5A or 6A, wherein the first functional particles have an average particle size (average length of longest dimension) in a range from 0.1 to 5000 (in some embodiments, in a range from 1 to 500, 1 to 120, 40 to 200, or even 5 to 60) micrometers, and wherein the second functional particles have an average particle size (average length of longest dimension) in a range from 0.1 to 5000 (in some embodiments, in a range from 1 to 500, 1 to 120, 40 to 200, or even 5 to 60) micrometers.

8A. The polymer matrix composite of any of Exemplary Embodiments 5A to 7A, wherein the first functional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, and wherein the second functional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the first and second functional particles.

9A. The polymer matrix composite of any preceding A Exemplary Embodiment, wherein the functional particles comprise at least one of inorganic or organic particles which participate in removing target moieties from at least one of a fluid or gas stream.

10A. The polymer matrix composite of any of Exemplary Embodiments 1A to 6A, 8A, or 9A, wherein the functional particles have an average particle size (average length of longest dimension) in a range from 0.1 to 5000 (in some embodiments, in a range from 1 to 500, 1 to 120, 40 to 200, or even 5 to 60) micrometers.

11A. The polymer matrix composite of any of Exemplary Embodiments 1A to 6A or 8A to 10A, further comprising nonfunctional particles.

12A. The polymer matrix composite of Exemplary Embodiment 11A, wherein the nonfunctional particles comprise at least one of inorganic or organic material which do not participate in removing target moieties from at least one of a fluid or gas stream.

13A. The polymer matrix composite of either Exemplary Embodiment 11A or 12A, wherein the nonfunctional particles have an average particle size (average length of longest dimension) in a range from 0.1 to 5000 (in some embodiments, in a range from 1 to 500, 1 to 120, 40 to 200, or even 5 to 60) micrometers.

14A. The polymer matrix composite of any of Exemplary Embodiments 10A to 12A, wherein the nonfunctional particles are present in a range from 1 to 99 (in some embodiments, in a range from 5 to 99, 10 to 99, 5 to 98, 10 to 98, 25 to 98, 50 to 98, 60 to 98, 70 to 98, 80 to 98, 90 to 98, 93 to 98, or even 95 to 98) weight percent, based on the total weight of the polymer matrix composite.

15A. The polymer matrix composite of any preceding A Exemplary Embodiment, wherein the porous polymeric network structure comprises at least one of polyurethane, polyester, polyamide, polyether, polycarbonate, polyimide, polysulfone, polyethersulfone, polyphenylene oxide, polyacrylate, polymethacrylate, polyacrylonitrile, polyolefin, styrene or styrene-based random and block copolymer, chlorinated polymer, fluorinated polymer, or copolymers of ethylene and chlorotrifluoroethylene.

16A. The polymer matrix composite of any preceding A Exemplary Embodiment, wherein the porous polymeric network structure comprises a phase-separated plurality of interconnected morphologies (e.g., at least one of fibrils, nodules, nodes, open cells, closed cells, leafy laces, strands, nodes, spheres, or honeycombs).

17A. The polymer matrix composite of any preceding A Exemplary Embodiment, wherein the porous polymeric network structure comprises a polymer having a number average molecular weight in a range from of $5\times10^4$ to $1\times10^7$ (in some embodiments, in a range from $1\times10^6$ to $8\times10^6$, $2\times10^6$ to $6\times10^6$, or even $3\times10^6$ to $5\times10^6$) g/mol.

18A. The polymer matrix composite of any preceding A Exemplary Embodiment, wherein the polymer matrix composite is in the form of a layer having a thickness in a range from 50 to 7000 micrometers.

19A. The polymer matrix composite of any preceding A Exemplary Embodiment, wherein the porous polymeric network structure is produced by an induced phase separation of a miscible thermoplastic polymer-solvent solution.

20A. The polymer matrix composite of Exemplary Embodiment 19A, wherein induced phase separation is at least one of thermally induced phase separation and solvent induced phase separation.

21A. The polymer matrix composite of any preceding A Exemplary Embodiment having surface area of at least 1 (in some embodiments, at least 5, 10, 15, 20, 30, 40, or even at least 50; in some embodiments, in a range from 50 to 500, or even 200 to 800) m$^2$/g.

22A. The polymer matrix composite of any preceding A Exemplary Embodiment, having first and second planar, opposed major surfaces.

23A. The polymer matrix composite of any preceding A Exemplary Embodiment, having first and second opposed major surfaces, wherein the first major surface is nonplanar (e.g., curved or protrusions with no planar surface there between).

24A. The polymer matrix composite of either Exemplary Embodiment 22A or 23A, wherein the first major surface has first protrusions extending outwardly from the first major surface. In some embodiments, the protrusions are integral with the first major surface.

25A. The polymer matrix composite of Exemplary Embodiment 24A, wherein the first protrusions are at least one of a post, a rail, a hook, a pyramid, a continuous rail, a continuous multi-directional rail, a hemisphere, a cylinder, or a multi-lobed cylinder.

26A. The polymer matrix composite of any of Exemplary Embodiments 22A to 25A, wherein the first major surface has first depressions extending into the first major surface.

27A. The polymer matrix composite of Exemplary Embodiment 26A, wherein the first depressions are at least one of a groove, a slot, an inverted pyramid, a hole (including a thru or blind hole), or a dimple.

28A. The polymer matrix composite of any of Exemplary Embodiments 24A to 27A, wherein the second major surface has second protrusions extending outwardly from the second major surface.

29A. The polymer matrix composite of Exemplary Embodiment 28A, wherein the second protrusions are at least one of a post, a rail, a hook, a pyramid, a continuous rail, a continuous multi-directional rail, a hemisphere, a cylinder, or a multi-lobed cylinder.

30A. The polymer matrix composite of any of Exemplary Embodiments 24A to 29A, wherein the second major surface has second depressions extending into the second major surface.

31A. The polymer matrix composite of Exemplary Embodiment 30A, wherein the second depressions are at least one of a groove, a slot, an inverted pyramid, a hole (including a thru or blind hole), or a dimple.

32A. The polymer matrix composite of any preceding A Exemplary Embodiment, wherein the polymer matrix composite has a bubble point pressure of at least 0.5 (in some embodiments, at least 0.75, 1, 1.5, 2, 3, 4, 5, 10, 15, 20, 25, 30, 35, 40, 45, 50, 55, 60, 65, 70, 75, 80, or even at least 75) psi.

33A. The polymer matrix composite of any preceding A Exemplary Embodiment, further comprising a reinforcement (e.g., attached to the polymer matrix composite, partial therein, and/or therein).

34A. The polymer matrix composite of any preceding A Exemplary Embodiment, that can be wrapped around a 0.5 mm (in some embodiments, 0.6 mm, 0.7 mm, 0.8 mm, 0.9 mm, 1 mm, 2 mm, 3 mm, 4 mm, 5 mm, 1 cm, 5 cm, 10 cm, 25 cm, 50 cm, or even 1 meter) rod without breaking.

35A. The polymer matrix composite of any preceding A Exemplary Embodiment, comprising at least one of a viscosity modifier (e.g., fumed silica, block copolymers, and wax), a plasticizer, a thermal stabilizer (e.g., such as available, for example, under the trade designation "IRGANOX 1010" from BASF, Ludwigshafen, Germany), an antimicrobial (e.g., silver and quaternary ammonium), a flame retardant, an antioxidant, a dye, a pigment, or an ultraviolet (UV) stabilizer.

1B. A method of making the polymer matrix composite of any preceding A Exemplary Embodiment, the method comprising:

combining (e.g., mixing or blending) a thermoplastic polymer, a solvent, and a plurality of functional particles to provide a slurry;

forming the slurry in to an article (e.g., a layer);

heating the article in an environment to retain at least 90 (in some embodiments, at least 91, 92, 93, 94, 95, 96, 97, 98, 99, or even at least 99.5) percent by weight of the solvent in the article, based on the weight of the solvent in the article, and solubilize at least 50 (in some embodiments, at least 55, 60, 65, 70, 75, 80, 85, 90, 95, 96, 97, 98, 99, or even 100) percent of the thermoplastic polymer, based on the total weight of the thermoplastic polymer; and inducing phase separation of the thermoplastic polymer from the solvent to provide the polymer matrix composite.

2B. The method of Exemplary Embodiment 1B, further comprising removing at least a portion (in some embodiments, at least 5, 10, 15, 20, 25, 30, 35, 40, 45, 50, 55, 60, 65, 70, 75, 80, 85, 90, 95, 96, 97, 98, 99, 99.5, or even 100) percent by weight of the solvent, based on the weight of the solvent in the formed article) of the solvent from the formed article after inducing phase separation of the thermoplastic polymer from the solvent.

3B. The method of Exemplary Embodiment 2B, wherein at least 90 percent by weight of the solvent, based on the weight of the solvent in the formed article, is removed, wherein the formed article, before removing at least 90 percent by weight of the solvent, based on the weight of the solvent in the formed article, of the solvent has a first volume, wherein the formed article, after removing at least 90 percent by weight of the solvent, based on the weight of the solvent in the formed article, has a second volume, and wherein the difference between the first and second volume (i.e., (the first volume minus the second volume) divided by the first volume times 100) is less than 10 (in some embodiments, less than 9, 8, 7, 6, 5, 4, 3, 2, 1, 0.75, 0.5, or even less than 0.3) percent.

4B. The method of Exemplary Embodiment 3B, wherein the article has first and second major surfaces with ends perpendicular to the first and second major surfaces, and where the ends are unrestrained during the solvent removal.

5B. The method of either Exemplary Embodiment 3B or 4B, wherein the formed article, after the solvent removal, has a porosity at least 5 (in some embodiments, at least 10, 20, 30, 35, 40, 45, 50, 55, 60, 65, 70, 75, 80, 85, or even at least 90; in some embodiments, in a range from 25 to 90) percent.

6B. The method of Exemplary Embodiment 1B, wherein no solvent is removed from the formed article (even after inducing phase separation of the thermoplastic polymer from the solvent).

7B. The method of any preceding B Exemplary Embodiment, wherein inducing phase separation includes thermally induced phase separation.

8B. The method of any preceding B Exemplary Embodiment, wherein the polymer in the slurry has a melting point, wherein the solvent has a boiling point, and wherein combining is conducted below the melting point of the polymer in the slurry, and below the boiling point of the solvent.

9B. The method of any preceding B Exemplary Embodiment, wherein the polymer in the slurry has a melting point, and wherein inducing phase separation is conducted at less than the melting point of the polymer in the slurry.

10B. The method of any preceding B Exemplary Embodiment, further comprising at least one of stretching or compressing the polymer matrix composite.

11B. The method of any of Exemplary Embodiments 1B to 9B, further comprising applying vibratory energy to the polymer matrix composite simultaneously with the applying a compressive force.

12B. The method of any preceding B Exemplary Embodiment, wherein the porous polymeric network structure comprises at least one of polyacrylonitrile, polyurethane, polyester, polyamide, polyether, polycarbonate, polyimide, polysulfone, polyethersulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

13B. The method of any preceding B Exemplary Embodiment, wherein the porous polymeric network structure comprises a plurality of interconnected morphologies (e.g., at least one of fibrils, nodules, nodes, open cells, closed cells, leafy laces, strands, nodes, spheres, or honeycombs).

14B. The method of any preceding B Exemplary Embodiment, wherein the porous polymeric network structure is produced by an induced phase separation of a miscible thermoplastic polymer-solvent solution.

15B. The method of Exemplary Embodiment 14B, wherein inducing phase separation includes thermally induced phase separation.

1C. A method of making the polymer matrix composite of any preceding A Exemplary Embodiment, the method comprising:

combining (e.g., mixing or blending) a thermoplastic polymer, a solvent for the thermoplastic polymer, and a plurality of functional particles to form a suspension of functional particles in a miscible thermoplastic polymer-solvent solution;

inducing phase separation of the thermoplastic polymer from the solvent; and removing at least a portion of the solvent to provide the polymer matrix composite.

2C. The method of Exemplary Embodiment 1C, wherein inducing phase separation includes at least one of thermally induced phase separation or solvent induced phase separation.

3C. The method of any preceding C Exemplary Embodiment, wherein the polymer in the miscible thermoplastic polymer-solvent solution has a melting point, wherein the solvent has a boiling point, and wherein combining is conducted above the melting point of the miscible thermoplastic polymer-solvent solution, and below the boiling point of the solvent.

4C. The method of any preceding C Exemplary Embodiment, wherein the polymer in the miscible thermoplastic polymer-solvent solution has a melting point, and wherein inducing phase separation is conducted at less than the melting point of the polymer in the miscible thermoplastic polymer-solvent solution.

5C. The method of any preceding C Exemplary Embodiment, further comprising at least one of stretching or compressing the polymer matrix composite.

6C. The method of any of Exemplary Embodiments 1C to 4C, further comprising applying vibratory energy to the polymer matrix composite simultaneously with the applying a compressive force.

7C. The method of any preceding C Exemplary Embodiment, wherein the porous polymeric network structure comprises at least one of polyacrylonitrile, polyurethane, polyester, polyamide, polyether, polycarbonate, polyimide, polysulfone, polyethersulfone, polyphenylene oxide, polyacrylate, polymethacrylate, polyolefin, styrene or styrene-based random and block copolymer, chlorinated polymer, fluorinated polymer, or copolymers of ethylene and chlorotrifluoroethylene.

8C. The method of any preceding C Exemplary Embodiment, wherein the porous polymeric network structure comprises a plurality of interconnected morphologies (e.g., at least one of fibrils, nodules, nodes, open cells, closed cells, leafy laces, strands, nodes, spheres, or honeycombs).

1D. A filter (e.g., a plate and frame filter, plate filter, depth filter, cartridge filter, capsule filter, bag filter, cross flow filter, tangential flow filtration (TFF), or a chromatography device) comprising the polymer matrix composite of any preceding A Exemplary Embodiment.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Air Flow Resistance Test

Air flow resistance was measured using a denisometer (obtained as Model 4110 from Gurley Precision Instruments, Troy, N.Y.) with a timer (obtained as Model 4320 from Gurley Precision Instruments). A sample was clamped in the tester. The timer and photo eye were reset and the cylinder was released, allowing air to pass through a 1 square inch (6.5 cm$^2$) circle with a constant force of 4.88 inches (12.4 cm) of water (1215 N/m$^2$). The time to pass 50 cm$^3$ of air was recorded.

Bubble Point Pressure Test

Bubble point pressure is a commonly used technique to characterize the largest pore in a porous membrane. Discs 47 mm in diameter were cut and samples soaked in mineral oil to fully fill and wet out the pores within the sample. The wet samples were then placed in a holder (47 mm; Stainless Holder Part #2220 from Pall Corporation, Port Washington, N.Y.). Pressure was slowly increased on the top of the sample using a pressure controller and gas flow was measured on the bottom with a gas flow meter. The pressure was recorded when there was a significant increase in flow from the baseline flow rate. This was reported as the bubble point pressure (pounds per square inch (psi) (centimeters of mercury, cm Hg or pascals, Pa)). This technique was a modification to ASTM F316-03 (2006), "Standard Test Methods for Pore Size Characteristics of Membrane Filters by Bubble Point and Mean Flow Pore Test," the disclosure of which is incorporated herein by reference, and included an automated pressure controller and flow meter to quantify when the bubble point pressure had been reached. The pore size was calculated per the ASTM using the following equation:

Limiting Pore Diameter (micrometer)=(Surface Tension in dynes/cm*0.415)/(Pressure in psi).

The factor of 0.415 was included since the pressure was in units of psi. A surface tension of 34.7 dynes/cm was used for the mineral oil.

Density and Porosity Test

The density of a sample was calculated using a method similar to ASTM F-1315-17 (2017), "Standard Test Method for Density of a Sheet Gasket Material," the disclosure of which is incorporated herein by reference, by cutting a 47 mm diameter disc, weighing the disc on an analytical balance of suitable resolution (typically 0.0001 gram), and measuring the thickness of the disc on a thickness gauge (obtained as Model 49-70 from Testing Machines, Inc., New Castle, Del.) with a dead weight of 7.3 psi (50.3 KPa) and a flat anvil of 0.63-inch (1.6 cm) diameter, with a dwell time of about 3 seconds and a resolution of +/−0.0001 inch. The density was then calculated by dividing the mass by the volume, which was calculated from the thickness and diameter of the sample. With the known densities and weight fractions of the components of the polymer matrix composite, the theoretical density of the polymer matrix composite was calculated by the rule of mixtures. Using the theoretical density and the measured density, the porosity was calculated as:

Porosity=[1−(measured density/theoretical density)]× 100[[punctuation?]]

Example 1

A 120-milliliter (4-ounce) glass jar was charged with 1.5 gram of an ultra-high molecular weight polyethylene (UHMWPE) (obtained under the trade designation "GUR-2126" from Celanese Corporation, Irving, Tex.), and 15.0 grams of functional azlactone particles (obtained under the trade designation "EMPHAZE AB-1 BEADS" from 3M Company, St. Paul, Minn.), and shook with an acoustic mixer (obtained under the trade designation "LABRAM RESONATACOUSTIC MIXER" from Resodyn Inc., Butte, Mont.) at 70% intensity for 1 minute. 47.0 grams of a low odor kerosene (obtained from Alfa Aesar, Ward Hill, Mass.) was added to this mixture, and stirred by hand with a spatula until a uniform slurry was obtained. The slurry was applied with a scoop at room temperature (about 25° C.) to a 3-mil (75-micrometer) heat stabilized polyethylene terephthalate (PET) liner (obtained under the trade designation "COATED PET ROLL #33716020500" from 3M Company), then a 3-mil (75-micrometer) heat stabilized PET liner ("COATED PET ROLL #33716020500") was applied on top to sandwich the slurry. The slurry was then spread between the PET liners by using a notch bar set to a gap of 36 mils (914.4 micrometers). The notch bar rails were wider than the PET liner to obtain an effective wet film thickness of about 30 mils (762 micrometers). Progressive multiple passes with increasing downward pressure of the notch bar were used to flatten the slurry. The sandwiched, formed slurry was placed on an aluminum tray and placed in a lab oven (obtained under the trade designation "DESPATCH RFD1-42-2E" from Despatch, Minneapolis, Minn.), at 135° C. (275° F.) for 5 minutes to activate (i.e., to allow the UHMWPE to dissolve into the solvent forming a single phase). The tray with the activated sandwiched formed slurry was removed from the oven and allowed to air cool to ambient temperature (about 25° C.), forming a solvent filled polymer matrix composite. Both the top and bottom liners were removed, exposing the polymer matrix composite to air. The polymer matrix composite was then placed back on a PET liner ("COATED PET ROLL #33716020500") on the tray and the tray was inserted into the lab oven ("DESPATCH RFD1-42-2E") at 100° C. (215° F.) for an hour. After solvent evaporation, the polymer matrix composite was removed from the oven, allowed to cool to ambient temperature, and characterized.

Referring to FIGS. 4A and 4B, a scanning electron microscope (SEM) digital image of a cross-section of the polymer matrix composite taken with a SEM (obtained under the trade designation "PHENOM" from FEI Company, Hillsboro, Oreg.) is shown. The cross-sectional sample was prepared by liquid nitrogen freeze fracturing followed by gold sputter coating with a sputter coater (obtained under the trade designation "EMITECH K550X" from Quorum Technologies, Laughton East Sussex, England). The azlactone functional particles shown are porous. The surface area including area from internal porosity of the particles was about 350 m$^2$/gram.

The resulting polymer matrix composite was 33.9 mils (0.86 millimeter) thick and had a density of was 0.29 g/cm$^3$ (as determined by the "Density and Porosity Test"), a pore size of 10.3 micrometers (as determined by the "Bubble Point Pressure Test"), and had a Gurley airflow of 4.5 sec/50 cm$^3$ (as determined by the "Air Flow Resistance Test").

Example 2

Example 2 was prepared as described for Example 1, except the functional azlactone particles ("EMPHAZE AB-1 BEADS") were replaced with 30 grams of jet milled, crosslinked guanylated polyethylenimine (G-PEI) (prepared as described in the Examples for U.S. Pat. Pub. No. 2017/0049926 (Langer-Anderson et al.)), the disclosure of which is incorporated herein by reference, and 15 grams of 5-micrometer polyamide (obtained under the trade designation "ORGASOL" from Arkema, King of Prussia, Pa.) particles were added, and 25 grams of the low odor kerosene was used.

Figure 5A:
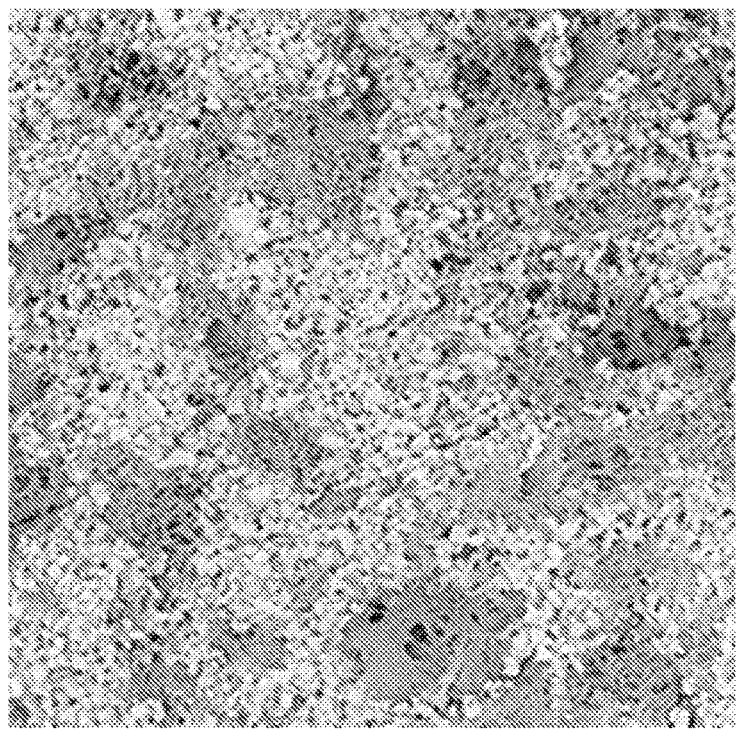
FIGS. 5A and 5B, show scanning electron microscope (SEM) micrographs of cross-sections of an exemplary polymer matrix composite (Example 2) described herein.
Figure 5B:
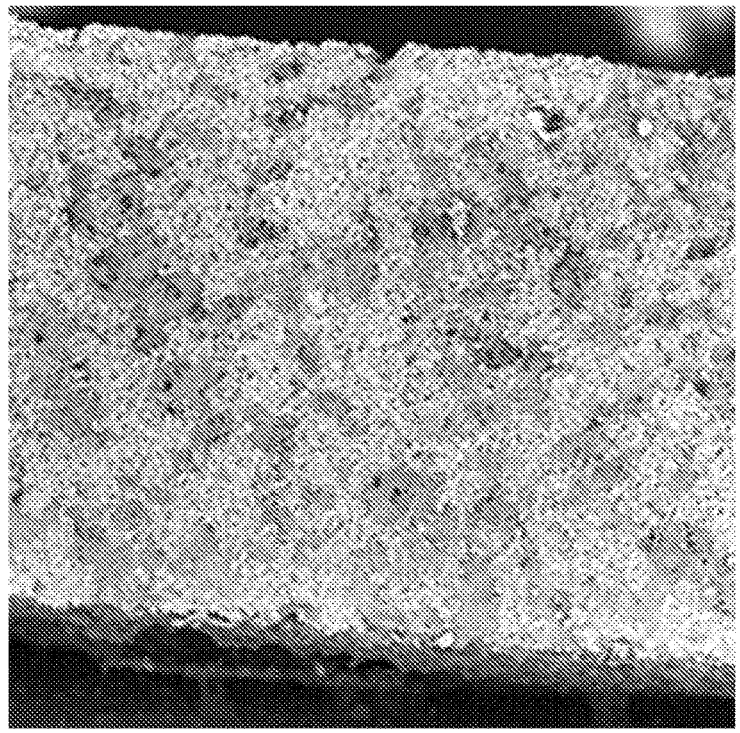

Referring to FIGS. 5A and 5B, a scanning electron microscope (SEM) digital image of a cross-section of the polymer matrix composite is shown. The original functional G-PEI particles were not initially porous. The larger and darker jet milled G-PEI particles dispersed in the matrix at least partially dissolved or swelled during the phase separation process and are separated by the smaller white polyamide filler particles as shown.

The resulting polymer matrix composite was 30.0 mils (0.76 millimeter) thick, and a pore size of 6.3 micrometers.

Composite samples were analyzed for static protein binding capacity by incubating disks of the composite in a solution of the test analyte overnight. Each disk was prepared by die-punching a 6-mm diameter disk from a polymer matrix composite sheet. Each disk was placed in a 5-mL centrifuge tube with 4.5 mL of bovine serum albumin (BSA) challenge solution (obtained as Catalog #A-7906 from Sigma Aldrich, St. Louis, Mo.) at a concentration of about 3.0 mg/mL in 25 millimolar tris(hydroxymethyl)aminomethane (TRIS) buffer, 50 millimolar NaCl, pH 8.0. The tubes were capped and tumbled overnight (14 hours) on a rotating mixer (obtained under the trade designation "LABQUAKE" from Thermal Scientific, Waltham, Mass.). The supernatant solutions were analyzed using a UV-VIS spectrometer at 280 nm (with background correction applied at 325 nm). The static binding capacity for each substrate was determined by comparison to the absorption of the starting BSA solution, and results were calculated in mg of BSA bound/cm$^3$ of composite volume. Three disks were analyzed on each of two different days. The BSA binding capacity (average of the six measurements) was 133 mg/cm$^3$.

Example 3

Example 3 was prepared as described for Example 1, except the functional azlactone particles ("EMPHAZE AB-1 BEADS") were replaced with 5 grams of low density glass bubbles (obtained under the trade designation "3M GLASS BUBBLES Kl" from 3M Company) having a dot pattern coating of nanosilver made as described in the Examples for U.S. Pat. No. 8,698,394 (McCutcheon et al.), the disclosure of which is incorporated herein by reference, and 23 grams of the low odor kerosene was used.

Referring to FIG. 6, a scanning electron microscope (SEM) digital image of a cross-section of the polymer matrix composite is shown. The SEM shows a leafy lace polymer matrix structure surrounding the coated glass bubbles.

The resulting polymer matrix composite was 29.6 mils (0.75 millimeter) thick, had a density of 0.09 g/cm$^3$, pores size of 4.1 micrometers, and had a Gurley airflow of 5.9 sec/50 cm$^3$.

Example 4

Example 4 was prepared as described for Example 1, except the functional azlactone particles were replaced with 25 grams of guanylated perlite particles (obtained under the trade designation "PERLITE 4106" from Sigma Aldrich Corp., St. Louis, Mo., and prepared as described in Example 1 of PCT Pub. No. WO2016/149233 (Griesgraber et al.), published Sep. 22, 2016, the disclosure of which is incorporated herein by reference), and 40 grams of the low odor kerosene.

Referring to FIG. 7, a scanning electron microscope (SEM) digital image of a cross-section of the polymer matrix composite is shown.

The resulting polymer matrix composite was 29.1 mils (0.74 millimeter) thick, had a density of 0.49 g/cm$^3$, a pore size of 10.3 micrometers, and had a Gurley airflow of 5.9 sec/50 cm$^3$.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A polymer matrix composite comprising:
   a porous polymeric network structure; and
   a plurality of functional particles distributed within the polymeric network structure, each of the functional particles having a surface and one or more functional groups directly attached to the surface or attached to a linker group which is in turn attached to the surface,
   wherein the polymer matrix composite has an air flow resistance at 25° C., as measured by the Air Flow Resistance Test, of less than 300 seconds/50 cm$^3$/500 micrometers.

2. The polymer matrix composite of claim 1, wherein the functional particles are present in a range from 1 to 99 weight percent, based on the total weight of the functional particles and the polymeric network structure.

3. The polymer matrix composite of claim 1, wherein the polymer matrix composite has a porosity less than 90 percent.

4. The polymer matrix composite of claim 1, wherein the porous polymeric network structure comprises at least one of polyurethane, polyester, polyamide, polyether, polycarbonate, polyimide, polysulfone, polyethersulfone, polyphenylene oxide, polyacrylate, polymethacrylate, polyacrylonitrile, polyolefin, styrene or styrene-based random and block copolymer, chlorinated polymer, fluorinated polymer, or copolymers of ethylene and chlorotrifluoroethylene.

5. The polymer matrix composite of claim 1, wherein the porous polymeric network structure comprises a polymer having a number average molecular weight in a range from of 5×10$^4$ to 1×10$^7$ g/mol, and wherein the polymer matrix composite is in the form of a layer having a thickness in a range from 50 to 7000 micrometers.

6. The polymer matrix composite of claim 1, wherein the polymer matrix composite has a bubble point pressure of at least 0.5 psi.

7. The polymer matrix composite of claim 1, wherein the porous polymeric network structure comprises a phase-separated plurality of interconnected morphologies.

8. A method of making the polymer matrix composite of claim 1, the method comprising:
combining a thermoplastic polymer, a solvent, and a plurality of functional particles to provide a slurry;
forming the slurry into an article;
heating the article in an environment to retain at least 90 percent by weight of the solvent in the article, based on the weight of the solvent in the article, and solubilize at least 50 by weight percent of the thermoplastic polymer, based on the total weight of the thermoplastic polymer; and
inducing phase separation of the thermoplastic polymer from the solvent to provide the polymer matrix composite.

9. The method of claim 8, wherein no solvent is removed from the formed article.

10. The method of claim 8, wherein inducing phase separation includes thermally induced phase separation.

11. The method of claim 8, further comprising at least one of stretching or compressing the polymer matrix composite.

12. The method of claim 8, further comprising applying vibratory energy to the polymer matrix composite simultaneously with the applying a compressive force.

13. A method of making the polymer matrix composite of claim 1, the method comprising:
combining a thermoplastic polymer, a solvent in which the thermoplastic polymer is soluble, and a plurality of functional particles to form a suspension of functional particles in a miscible thermoplastic polymer-solvent solution;
inducing phase separation of the thermoplastic polymer from the solvent; and
removing at least a portion of the solvent to provide the polymer matrix composite.

14. The method of claim 13, wherein inducing phase separation includes at least one of thermally induced phase separation or solvent induced phase separation.

15. The method of claim 14, wherein the polymer in the miscible thermoplastic polymer-solvent solution has a melting point, wherein the solvent has a boiling point, and wherein combining is conducted above the melting point of the miscible thermoplastic polymer-solvent solution, and below the boiling point of the solvent.

16. The method of claim 13, wherein the polymer in the miscible thermoplastic polymer-solvent solution has a melting point, and wherein inducing phase separation is conducted at less than the melting point of the thermoplastic polymer in the miscible thermoplastic polymer-solvent solution.

17. The method of claim 13, further comprising at least one of stretching or compressing the polymer matrix composite.

18. The method of claim 13, further comprising applying vibratory energy to the polymer matrix composite simultaneously with the applying a compressive force.

19. A filter comprising the polymer matrix composite of claim 1.

* * * * *